(12) United States Patent
Rothschild et al.

(10) Patent No.: US 9,841,606 B2
(45) Date of Patent: Dec. 12, 2017

(54) OPTICAL FILTERS WITH ENGINEERED BIREFRINGENCE

(71) Applicant: Massachusetts Institute of Technology, Cambridge, MA (US)

(72) Inventors: Mordechai Rothschild, Newton, MA (US); Kenneth Diest, Bedford, MA (US); Vladimir Liberman, Reading, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 644 days.

(21) Appl. No.: 14/532,597

(22) Filed: Nov. 4, 2014

(65) Prior Publication Data
US 2017/0299881 A1    Oct. 19, 2017

Related U.S. Application Data

(60) Provisional application No. 61/899,583, filed on Nov. 4, 2013.

(51) Int. Cl.
*G02B 5/30* (2006.01)
*G02B 27/28* (2006.01)

(52) U.S. Cl.
CPC ............. *G02B 27/288* (2013.01); *G02B 5/30* (2013.01); *G02B 5/3083* (2013.01); *G02B 27/28* (2013.01)

(58) Field of Classification Search
CPC ........ G02B 27/28; G02B 27/288; G02B 5/30; G02B 5/3083
USPC ..................................................... 359/489.19
See application file for complete search history.

(56) References Cited

U.S. PATENT DOCUMENTS 4,341,442 A * 7/1982 Johnson ............... G02B 6/2713
                                                    359/489.17
4,712,881 A * 12/1987 Shurtz, II ............. G02B 5/3058
                                                    359/352

(Continued)

FOREIGN PATENT DOCUMENTS

| KR | 10-0491752 B1 | 5/2005 |
| WO | WO 99-36258 A1 | 7/1999 |
| WO | WO 2015/112223 A2 | 7/2015 |

OTHER PUBLICATIONS

International Preliminary Report on Patentability and Written Opinion of the International Searching Authority for International Application No. PCT/US2014/063876, entitled "Optical Filters With Engineered Birefringence", dated May 10, 2016.

(Continued)

*Primary Examiner* — William R Alexander
(74) *Attorney, Agent, or Firm* — Hamilton, Brook, Smith & Reynolds, P.C.

(57) ABSTRACT

An embodiment according to the invention provides an optical filter that combines narrow spectral bandwidth and high rejection of out-of-band radiation with a wide acceptance angle. These filters are based on the nanoscale engineering of materials ("metamaterials") that possess predefined birefringence determined by a combination of their geometry and material composition. These metamaterials are combined into a functional optical filter that can exhibit true zero crossing, with acceptance angle effectively decoupled from bandwidth, at practically any wavelength of interest.

23 Claims, 5 Drawing Sheets

(56) References Cited

U.S. PATENT DOCUMENTS

| | | | |
|---|---|---|---|
| 5,929,946 A | 7/1999 | Sharp et al. | |
| 6,590,707 B1 | 7/2003 | Weber | |
| 6,767,594 B1 * | 7/2004 | Miroshin | G02B 3/005 |
| | | | 349/106 |
| 6,927,900 B2 * | 8/2005 | Liu | B32B 17/10 |
| | | | 359/359 |
| 7,630,022 B1 * | 12/2009 | Baur | G02B 5/3083 |
| | | | 349/117 |
| 8,062,836 B2 | 11/2011 | Kim et al. | |
| 9,625,767 B2 * | 4/2017 | Li | G02F 1/134309 |
| 2004/0051875 A1 * | 3/2004 | Mi | G02B 1/10 |
| | | | 356/429 |
| 2006/0127830 A1 * | 6/2006 | Deng | G02B 5/3083 |
| | | | 431/188 |
| 2007/0166045 A1 * | 7/2007 | Wang | G02B 27/283 |
| | | | 398/152 |
| 2008/0080050 A1 * | 4/2008 | Wang | G02B 5/281 |
| | | | 359/487.02 |
| 2011/0249334 A1 * | 10/2011 | Merrill | G02B 5/0841 |
| | | | 359/489.19 |

OTHER PUBLICATIONS

Notification of Transmittal of The International Search Report and The Written opinion of the International Searching Authority, or the Declaration, PCT/US2014/063876, entitled "Optical Filters With Engineered Birefringence", dated Jul. 30, 2015.

\* cited by examiner

FIG. 1

(Prior Art)

FIG. 2

(Prior Art)

OPTICAL FILTERS WITH ENGINEERED BIREFRINGENCE

RELATED APPLICATION

This application claims the benefit of U.S. Provisional Application No. 61/899,583, filed on Nov. 4, 2013, the entire teachings of which application are incorporated herein by reference.

GOVERNMENT SUPPORT

This invention was made with Government support under Contract No. FA8721-05-C-0002 awarded by the U.S. Air Force. The Government has certain rights in the invention.

BACKGROUND OF THE INVENTION

The performance of advanced optical imaging or communication systems is often limited by the need to simultaneously select a small fractional frequency bandwidth and possess a large acceptance angle. For instance, the performance characteristics such as data rate and distance of optical communication systems that rely on laser beams propagating through turbulent media (submarine communication, ground to cloud communication) are dramatically enhanced by suitable bandwidths and acceptance angles. Such systems must have a narrow acceptance bandwidth in order to benefit from the intrinsically narrow linewidth of the laser and reject ambient light, while being able to handle laser beams reaching the detector from multiple directions due to scattering in the propagating medium. Small operating fractional linewidths of $10^{-3}$ to $10^{-7}$ coupled with a relatively large angular acceptance of plus or minus 10 to 30 degrees can enable radically improved system performance. Other applications include astronomical telescopes that image very narrow atomic/ionic emission lines of extended objects, where the desired angular field of view is substantial. This essential function of narrow spectral acceptance and wide angular acceptance is handled by specialty optical filters.

There are several technologies that attempt to fulfill optical filter requirements, but none meets them all simultaneously.

Figure 1:
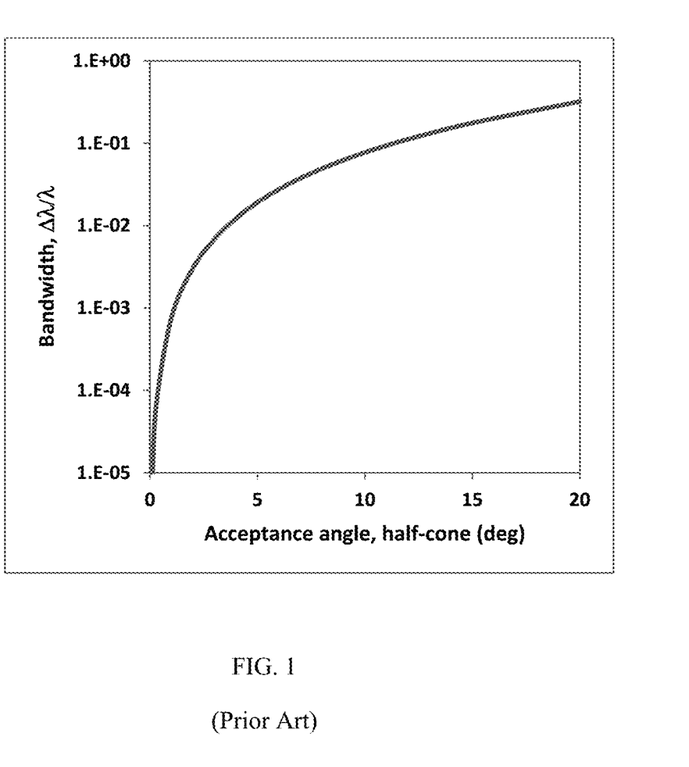
FIG. 1 is a graph of bandwidth versus acceptance angle for a conventional planar interference-based optical filter, in accordance with the prior art.

The most common method is based on planar structures that induce interference in order to sharpen the spectral response. The techniques may be based on Fabry-Perot cavities, solid etalons, multilayer dielectric stacks or other similar geometries. In all instances, the underlying phenomenon is the same, and its limitation has been widely understood: even small deviations from the designed angle of incidence cause the central frequency to shift out of the designed value by more than the nominal bandwidth. In fact, the bandwidth has a functional dependence on the acceptance angle $\alpha$, which is proportional to $(\sec\alpha - 1)$. At very small angles, the bandwidth behaves as the square of the angle, but the higher order terms in the series expansion of the sec function become dominant quite quickly. Consequently the bandwidth grows first quadratically with acceptance angle, then even more rapidly. This is a fundamental limitation on the acceptance angle of all narrow-bandwidth planar interference-based filters (see FIG. 1). Furthermore, the smaller the required fractional bandwidth the more complex the filter design, and the more lossy the filter. Multilayers comprising in excess of 200 layers may be required, and the unavoidable scattering losses at each of the interfaces can amount to significant transmission losses, in addition to the complex fabrication and dimensional control required of each layer (Reference 1).

A different principle is involved when the wavelength selectivity is obtained by utilizing birefringent crystals in conjunction with polarization selective filters (References 2-7). If several birefringent crystals are arranged with suitable orientation and crystal lengths, incident light at select frequencies is decomposed into two polarizations in such a way that when they recombine at the exit, they interfere with other destructively, except over a narrow bandwidth. Such birefringence-based filters come in several versions, known as Lyot filters, Lyot-Ohman filters, Solc filters, and so on. These filters have potentially a wider angular field of view than the equivalent Fabry-Perot filters, although the angle still depends on the bandwidth in a quadratic manner (Reference 2). The birefringent filters have their own limitations, mainly their bulkiness and the need to laboriously align the components (crystals, polarizers).

Figure 2:
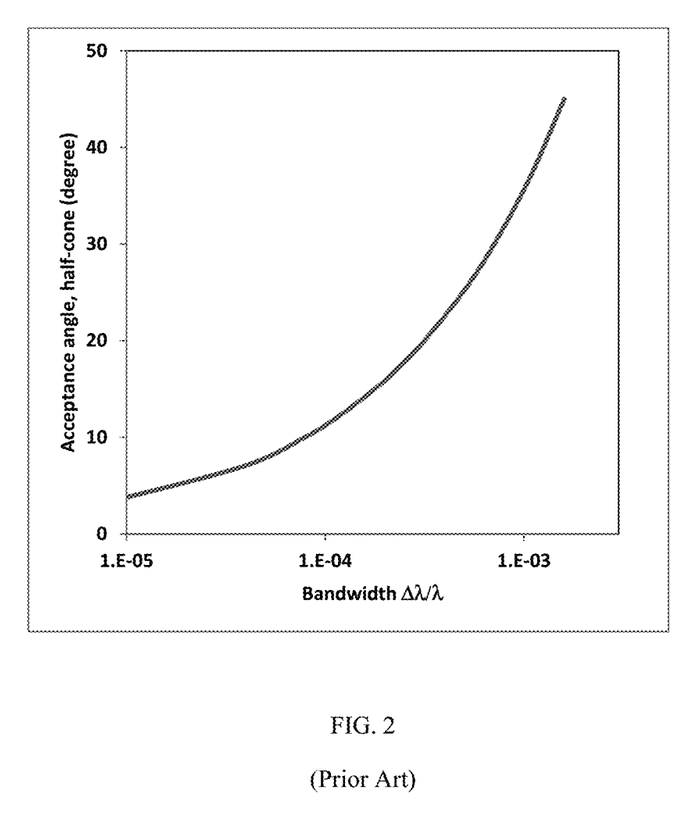
FIG. 2 is a graph of bandwidth versus acceptance angle for a proposed cadmium sulfide crystal, in accordance with the prior art.

One specific kind of birefringence-based filter has been proposed, which can overcome the angle-bandwidth tradeoff (References 8, 9). However, it can be realized only when there is a crystal with unique properties, such that it has zero birefringence at the operating wavelength but non-zero birefringence at all other wavelengths. In other words, the two indices of refraction have independent wavelength-varying dispersion behavior in such a way that they "cross" at the operating wavelength; hence the term "zero crossing" filter. If such a crystal can be found, then the bandwidth is determined by the dispersion of the birefringence rather than by the birefringence itself, and it is independent of angle of incidence. In practice, only one such crystal has been proposed, cadmium sulfide (CdS), and even it does not have a true zero crossing, though at one specific wavelength it has a wide angle of acceptance (see FIG. 2). Furthermore, this wavelength is determined by the intrinsic crystal properties and cannot be adjusted.

A completely different approach employs very narrow-bandwidth transitions in select atoms, where the wavelength to be detected coincides with an atomic excitation transition, and the detection itself is carried out at a (usually longer) re-emission wavelength. The atoms are most commonly in gaseous phase and require suitable magnetic fields and temperature stabilization. Filters based on the Cs-atom transitions in the blue (~455 nm) have been engineered (References 10, 11), and filters based on other alkali atoms (Reference 12) have been proposed or demonstrated in the laboratory. While these atomic filters have a very narrow bandwidth, as low as 0.001 nm, and angle of acceptance limited only by the overall system optics, they are also large, complex, cumbersome, and environmentally sensitive. The wavelengths at which they operate comprise a limited set with little tuning flexibility, as they are determined by the available atoms and their energy levels.

SUMMARY OF THE INVENTION

An embodiment according to the invention provides an optical filter that combines narrow spectral bandwidth and high rejection of out-of-band radiation with a wide acceptance angle. These filters are based on the nanoscale engineering of materials ("metamaterials") that possess predefined birefringence determined by a combination of their geometry and material composition. These metamaterials are combined into a functional optical filter that can exhibit true zero crossing, with acceptance angle effectively decoupled from bandwidth, at practically any wavelength of interest.

In accordance with an embodiment of the invention, there is provided an optical filter. The optical filter comprises an anisotropically patterned array comprising segments of a first material that is, absent patterning, at least one of (a) naturally isotropic or (b) naturally weakly birefringent with a weak dependence of the birefringence on wavelength; and at least one segment of a second material that is birefringent due to its structure at dimensions smaller than a pattern dimension of the anisotropically patterned array.

In further, related embodiments, the pattern dimension of the anisotropically patterned array may be less than about one fifth of an operating wavelength of light filtered by the optical filter, such as on the order of one tenth of the operating wavelength of light filtered by the optical filter. The second material may be birefringent due to structure at dimensions on the scale of between about 0.1 nanometer and about 10 nanometers. The segments of the first material may be spaced apart by a predetermined distance, and the at least one segment of the second material may extend for at least a portion of the predetermined distance between the segments of the first material.

In further, related embodiments, the filter may be configured to act as a zero crossing birefringent filter such that two indices of refraction of the filter have substantially independent wavelength-varying dispersion behavior, and the two indices of refraction are the same at a zero crossing wavelength of the filter. The filter may be configured to filter light at an acceptance angle and over a bandwidth, such that the acceptance angle does not depend substantially on the bandwidth. A zero crossing wavelength of the filter may be configured based on at least the pattern dimension of the anisotropically patterned array, a dielectric function of the first material, a dielectric function of the second material and a fill factor of the second material within the anisotropically patterned array.

In another embodiment according to the invention, the segments of first material may comprise parallel planar layers of the first material, and the at least one segment of the second material may comprise parallel planar layers of the second material extending for at least a portion of a distance between the parallel planar layers of the first material. The at least one segment of the second material may be aligned by irradiation with linearly polarized light.

In another embodiment according to the invention, the segments of first material may comprise concentric rings of the first material, and the at least one segment of the second material may comprise concentric rings of the second material, extending for at least a portion of a distance between the concentric rings of the first material. The at least one segment of the second material may be aligned by irradiation with at least one of a radially polarized beam and an azimuthally polarized beam.

In further related embodiments, the filter may comprise a Lyot filter or a Solc filter. The first material may comprise at least one of: glass, a transparent polymer, an insulating oxide, a transparent conducting oxide, a crystal and a salt. The first material may comprise at least one of: silicon oxide, silicon dioxide, quartz, magnesium fluoride, cadmium sulfide, indium tin oxide, indium zinc oxide, silicon nitride, aluminum oxide, sapphire, chalcogenide glass, silicon, germanium and silicon carbide. The pattern dimension of the anisotropically patterned array may be between about 20 nm and about 5 microns. The second material may comprise at least one of: a liquid crystal, a photoalignable polymer, and a nanowire. The optical filter may be configured to act as an actively controlled optical filter. The optical filter may be configured to act as an optical filter in the infrared.

In another embodiment according to the invention, there is provided a method of manufacturing an optical filter, comprising: fabricating at least one segment of a first material that is, absent patterning, at least one of (a) naturally isotropic or (b) naturally weakly birefringent with a weak dependence of the birefringence on wavelength; and fabricating at least one segment of a second material that is birefringent due to its structure at dimensions smaller than a pattern dimension of the anisotropically patterned array. The fabricating of the first material and the fabricating of the second thereby forms an anisotropically patterned array comprising segments of the first material interspersed with the at least one segment of the second material. The method further comprises aligning the at least one segment of the second material.

In further related embodiments, the method may comprise performing at least one of physical vapor deposition and atomic layer deposition to fabricate at least one of the anisotropically patterned array and the at least one segment of the second material. The method may comprise etching a crystal comprising the second material to form the at least one segment of the second material.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

An embodiment according to the invention provides an optical filter with true zero crossing, thereby effectively decoupling acceptance angle from bandwidth. Furthermore, an embodiment allows true zero crossing at the wavelength of choice, thereby enabling applications at practically any wavelength of interest. In addition, embodiments permit optical filters having compact designs with low form factors.

In accordance with an embodiment of the invention, an artificially engineered birefringent device combines two elements: a) an anisotropically patterned material that provides "form birefringence," which is defined by the geometry of the fabricated nanostructures and the optical properties of the material; and b) a material that has birefringence, here "material birefringence," that is due to its structure at dimensions smaller than the patterning dimension of the form birefringence.

For the "form birefringence" in accordance with an embodiment of the invention, the anisotropically patterned material is produced in a material that would otherwise be isotropic or would have natural birefringence that only weakly depends on the wavelength. For example, the anisotropically patterned material may be glass, fused, silica, sapphire, or any other largely transmissive material, including electrically conducting glasses such as indium tin oxide (ITO). The patterning, achieved at dimensions that are $\sim 1/10^{th}$ of the wavelength (i.e., for example, at ~50 nm for operation in the visible, although other wavelengths may be used), provides the form birefringence. The pattern dimension of the anisotropically patterned array may, for example, be between about 20 nm and about 5 microns. As discussed further below, this form birefringence and the nanostructures that give rise to it can be designed deterministically using computational methods based those of Reference 13, I. Richter, P.-C. Sun, F. Xu, and Y. Fainman, "Design considerations of form birefringent microstructures," Applied Optics Vol. 34, No. 14, pp. 2421-2429 (1995), the teachings of which are incorporated by reference in their entirety.

For the "material birefringence" in accordance with an embodiment of the invention, a material is used that has birefringence due to its structure at dimensions smaller than the form birefringence described above. Using again the visible wavelengths as an example, this "material birefringence" exists on the scale of ~1-10 nm. For example, the material birefringence may exist on a scale from between about 1 nm and about 10 nm, or from about 0.1 nm to about 10 nm, and in particular as low as about 0.3 nm. This material is intended to fill in some or all of the spaces patterned into the form birefringence. Therefore, for ease of production, materials can be used such that there is a deposition or etching process to enable the fabrication of devices with both the form and material birefringence. Examples of such materials are:

a) Liquid crystals, which have a structural anisotropy on the scale of ~1-5 nm, and which can be aligned by chemical surface treatment, surface nanostructuring, electric fields, etc.

b) Photoalignable polymers, which have molecule-scale anisotropy and which can be aligned using polarized light.

c) Nanowires, with diameters of 5-10 nm and lengths of 100 nm or more, especially if they are of high-index material, and which possess anisotropy by virtue of their geometry and polarizability (Reference 14). Alignment may be achieved by surface nanostructuring, illumination, or fluidic means.

In accordance with one embodiment of the invention, liquid crystals may be used to provide the material birefringence. Liquid crystals have two advantageous properties:

1) Liquid crystals encompass a broad class of chemical formulations, enabling design and selection of compounds with specific desired birefringence and dispersion of birefringence, chemical stability, ease of processing, cost, and compatibility with the rest of the system.

2) There is a large body of knowledge and chemical infrastructure, which can support optimization of liquid crystals for this application.

An optical filter in accordance with an embodiment of the invention provides: flexibility in the choice of the operating wavelength, in order to accommodate available laser wavelengths or transmission windows in the propagating media; active tunability of the central wavelength; a compact form factor that enables effective coupling to the detector; and stability with respect to environmental factors such as temperature.

An optical filter in accordance with an embodiment of the invention can be used as an optical filter at wavelengths from the deep ultraviolet to the far infrared, i.e., at wavelengths from about 0.2 micron to about 50 microns, which includes, but is not limited to, both the visible and the infrared. As used herein, unless specified otherwise or by context, reference to "light filtered by the optical filter" includes wavelengths from about 0.2 micron to about 50 microns.

In accordance with an embodiment of the invention, the combination of form birefringence and material birefringence can be designed according to rules and computational models, such as using techniques based on References 13 and 15 as discussed further below, to achieve a total birefringence which makes the zero-crossing filter concept not only feasible but having additional desirable properties as listed above. This engineered birefringence is obtained because the form birefringence can be designed to enhance one or the other refractive index of the birefringent material, depending on the relative orientation of the nanostructured geometry and the intrinsically birefringent material. Thus, even if the birefringent material does not have zero crossing—and most materials do not—the form birefringence can be designed in such a way as to bias one index more than the other, inducing an artificially designed zero crossing (see, for example, zero crossing 307 of FIG. 3B, discussed further below). Furthermore, this biasing can be made wavelength-sensitive, so that the zero crossing occurs at a pre-determined wavelength. As long as the two indices of the birefringent material have different dispersions, i.e., different dependences on wavelength, the form birefringence can be designed in such a way that the two indices of the overall device (form plus material) are equal to each other at a predetermined wavelength.

For example, in accordance with an embodiment of the invention, the form birefringence and the nanostructures that give rise to it can be designed deterministically using rules and computational methods based on those of Reference 13, I. Richter, P.-C. Sun, F. Xu, and Y. Fainman, "Design considerations of form birefringent microstructures," Applied Optics Vol. 34, No. 14, pp. 2421-2429 (1995), and Reference 15, A. Emoto, M. Nishi, M. Okada, S. Manabe, S. Matsui, N. Kawatsuki, and H. Ono, "Form birefringence in intrinsic birefringent media possessing a subwavelength structure," Applied Optics Vol. 49, No. 23, pp. 4355-4361 (2010), the teachings of both of which references are incorporated by reference in their entirety. In particular, alternating layers of two different materials may be used, such that the resulting optical properties of the resulting, bulk structure are suitable to act as an optical filter in accordance with an embodiment of the invention. The thickness of each layer is at least 5 to 10 times smaller than the wavelength of the light that passes through the material, so that Effective Medium Theory (EMT) applies. This theory is developed from averaging the values of the constituents that make up the composite material. First order EMT is simply based on averaging the fractions of the two materials involved. The two equations used for this are listed as Eq. (1) in Reference 13:

$$\epsilon_{0,E\perp K} = F\epsilon_{III} + (1-F)\epsilon_I, \quad (1)$$

$$\epsilon_{0,E\|K} = \frac{\epsilon_{III}\epsilon_I}{F\epsilon_I + (1-F)\epsilon_{III}},$$

where $\epsilon_I$ and $\epsilon_{III}$ are the real dielectric constants of the region of incident material and substrate material of a high spatial frequency (HSF) grating, respectively; F is the duty cycle (filling factor) of the grating, and $\epsilon_{0,E\perp K}$ and $\epsilon_{0,E\|K}$ are the zero order approximations of the effective dielectric constants of a single homogeneous anisotropic layer with the same thickness as the grating for TE and TM polarizations, respectively, of a normally incident electromagnetic wave.

Second order EMT extends the calculation to take into account a planar geometry, such as that of the embodiment of FIG. 4, below. The two equations used for this are listed as Eq. (2) in Reference 13:

$$\epsilon_{2,E\perp K} = \epsilon_{0,E\perp K} + \frac{1}{3}\left(\frac{\Lambda}{\lambda}\right)^2 \pi^2 F^2(1-F)^2(\epsilon_{III} - \epsilon_I)^2, \quad (2)$$

$$\epsilon_{2,E\|K} = \epsilon_{0,E\|K} + \frac{1}{3}\left(\frac{\Lambda}{\lambda}\right)^2 \pi^2 F^2(1-F)^2\left(\frac{1}{\epsilon_{III}} - \frac{1}{\epsilon_I}\right)^2 \times \epsilon_{0,E\|K}^3 \epsilon_{0,E\perp K},$$

where $\Lambda$ is the grating period, $\lambda$ is the wavelength of the normally incident electromagnetic wave, and $\epsilon_{2,E\perp K}$ and $\epsilon_{2,E\|K}$ are the second order approximations of the effective dielectric constants of the single homogeneous anisotropic layer, with other symbols having the same meanings as in Equation (1).

These two models (i.e., first order and second order EMT) are combined to derive exactly how the thickness of each layer and the optical properties of each constituent material affect the resulting, macroscopic optical properties. This results in a set of four coupled equations that can be solved to determine the two indices of refraction of the resulting "form birefringent" material. It will be appreciated that other techniques may be used.

Figure 3A:
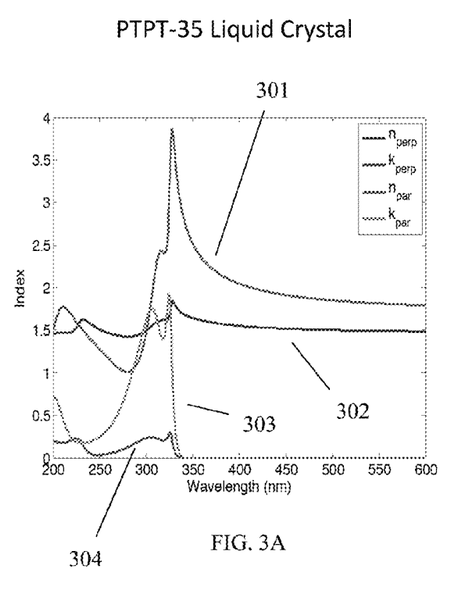
FIG. 3A is a graph of the real and imaginary parts of the indices of refraction of a material used to provide "material birefringence" in accordance with an embodiment of the invention.

FIG. 3A is a graph of the real and imaginary parts of the indices of refraction of a material used to provide "material birefringence" in accordance with an embodiment of the invention. Here, the real and imaginary components are shown as $n_{par}$ 301, $n_{perp}$ 302, $k_{par}$ 303 and $k_{perp}$ 304. In the particular embodiment illustrated in FIG. 3A, the second material is PTPT-35 liquid crystal.

Figure 3B:
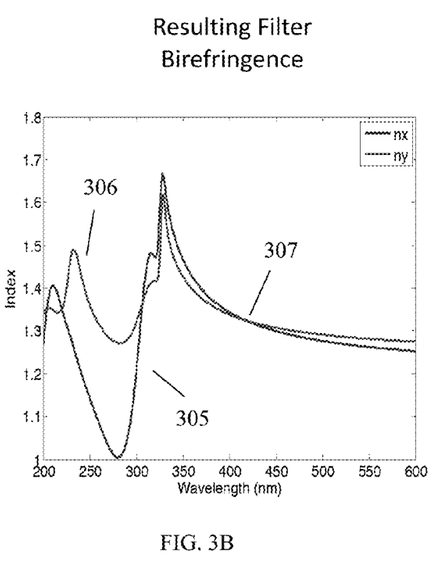
FIG. 3B is a graph of the resulting filter birefringence of the device that includes the material of FIG. 3A, in accordance with an embodiment of the invention.

FIG. 3B is a graph of the resulting filter birefringence of the device that includes the material of FIG. 3A, in accordance with an embodiment of the invention. The resulting filter effectively has two resulting indices of refraction, $n_x$ 305 and $n_y$ 306. As can be seen in FIG. 3B, the two indices have independent wavelength-varying dispersion behavior, but have a zero crossing 307 at which the two indices of refraction are the same. Although FIGS. 3A and 3B show an example in which wavelengths from 200 nm to 600 nm are given, it should be appreciated that optical filters in accordance with an embodiment of the invention can in general be used as an optical filter over a wider range of wavelengths, from the deep ultraviolet to the far infrared, i.e., at wavelengths from about 0.2 micron to about 50 microns.

Figure 4:
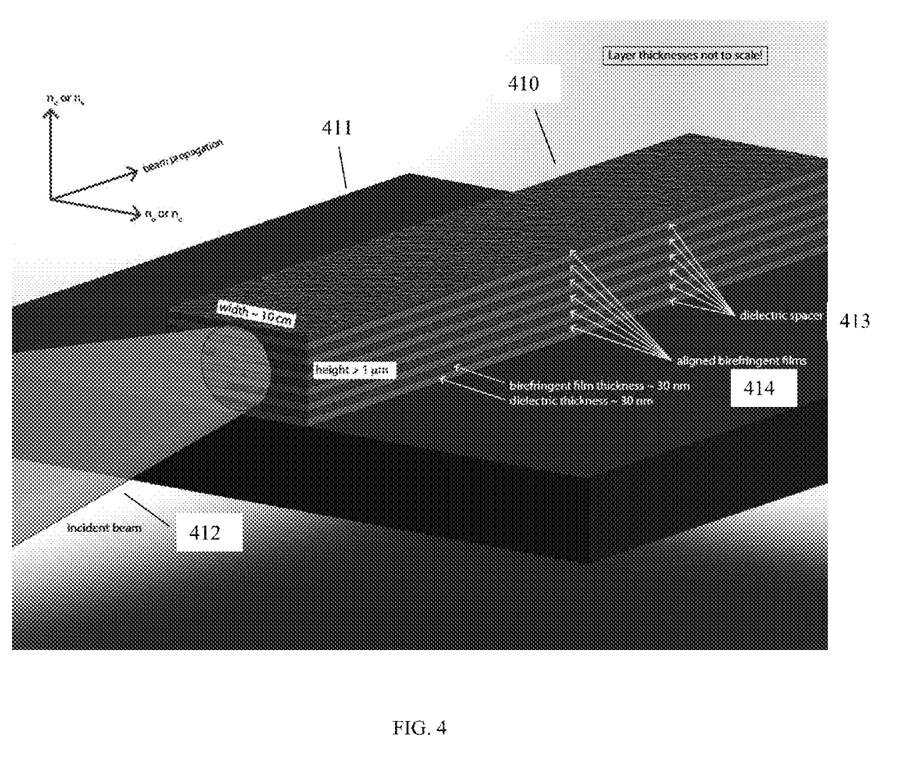
FIG. 4 is a schematic diagram of an optical filter comprising a planar geometry, in accordance with an embodiment of the invention.

FIG. 4 is a schematic diagram of an optical filter 410 comprising a planar geometry, in accordance with an embodiment of the invention. In the embodiment of FIG. 4, the geometry of the nanostructured form birefringence is one dimensional, i.e., parallel slabs 413, 414 on a substrate 411, fabricated into segments with the length of each segment being double that of the previous one, and the segments separated by built-in polarizers. The intrinsically birefringent material 414, such as liquid crystal or photoalignable polymer, will be aligned by irradiation with linearly polarized light. This geometry is the most straightforward to conceptualize and fabricate, but the final optical performance is limited to filtering in one dimension only. The filter 410 includes a first material 413, the dielectric spacer, that provides the "form birefringence," and a second material 414, the aligned birefringent films, that provides the "material birefringence." The incident beam is shown at 412. The thickness of the layers of the first material 413 and the second material 414 may, for example, be on the order of 30 nanometers, although optical filters in accordance with an embodiment of the invention may in general be used over a wide range of wavelengths, i.e., at wavelengths from about 0.2 micron to about 50 microns, and hence the layer thicknesses will vary accordingly. The overall width of the filter 410 may, for example, be on the order of 10 centimeters, while the overall height may, for example, be greater than about 1 micrometer. A higher overall height is preferable in order to receive as much incident beam as possible, but a greater height adds to expense of fabrication. The width may be determined by the technique of fabrication, for example by being equal to the width of a wafer from which the optical filter is fabricated.

Figure 5:
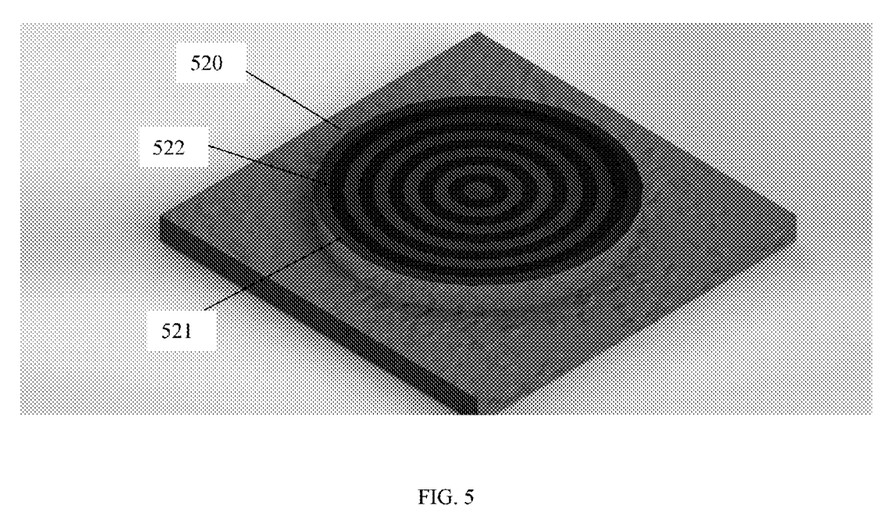
FIG. 5 is a schematic diagram of an optical filter comprising a concentric ring geometry, in accordance with an embodiment of the invention.

FIG. 5 is a schematic diagram of an optical filter 520 comprising a concentric ring geometry, in accordance with an embodiment of the invention. The alternative design of FIG. 5 provides for two-dimensional functionality by nanostructuring the form birefringence into arrays of concentric rings 521. Arrays with increasing lengths will be fabricated and then assembled one on top of the other, where again the segments are separated by suitable polarizers. In this configuration, the intrinsically birefringent material 522, such as liquid crystal or photoalignable polymer, will be aligned by irradiation with a radially or azimuthally polarized beam. Alignment can be performed, for example, by making the innermost and outermost layers of the concentric structure be electrodes, and applying an electric field between the electrodes.

These arrays of concentric rings shown schematically in FIG. 5 may be stacked to form a zero-crossing filter in two different arrangements: one is a Lyot filter, where each segment is twice as long as the previous one and all optical axes are aligned to each other. The other is a Solc filter; in this case, the thickness of all segments is the same, but the optical axes of the segments are rotated at prescribed angles with respect to each other (Reference 8).

It should be appreciated that, while the embodiments of FIGS. 4 and 5 are simplified and show only one segment, other components will also be present in a fully fabricated optical filter. For example, multiple segments having different lengths (such as multiples of two times as long as previous segments) and polarizers may also be present in the fully fabricated optical filter. In addition, it should be appreciated that each segment of a fabricated device can involve many alternating layers of the first material and the second material.

In accordance with an embodiment of the invention, based on the wavelength of the desired zero crossing, the necessary thickness of both the first material and the second material may be determined, for example using the computational techniques described above. In order to fabricate the device, one manufacturing technique comprises, first, patterning a naturally non-birefringent material to create "form birefringence," and then, filling in gaps in the patterned material using a naturally birefringent material to create "material birefringence," such as by using liquid crystal. Alternatively, a material having "material birefringence" could be patterned first, and then gaps in that material could be filled in with a non-birefringent material.

In one embodiment, in order to fabricate a concentric ring embodiment, a dielectric spacer is deposited onto a base substrate. For example, a spin-on glass process, a Physical Vapor Deposition technique, an Atomic Layer Deposition technique, evaporative sputtering, or a thin-film deposition technique may be used. Once the dielectric is uniform, a pattern is formed in it to create the "form birefringence." For example, the pattern may be formed by electron lithography, or any nano-patterning technique; for example, focused ion beam milling, nano-imprint lithography or photolithography may be used. Etching may then be used to remove regions in which a material having "material birefringence," such as liquid crystal, may be laid down. The material, such as liquid crystal, is then laid down, for example using spin-coating. The material, such as liquid crystal, is then aligned. The concentric ring embodiment should be formed with enough height to have sufficient interaction volume with light being filtered.

In another embodiment, the concentric ring embodiment of FIG. 5 may be fabricated by starting with a birefringent crystal material, then etching out areas desired for an isotropic spacer material, and then depositing the isotropic spacer material. The birefringent crystal material may, for example, be quartz, sapphire, a ferroelectric material, or barium titanate ($BaTiO_3$). Liquid etchants may be used to etch along a crystalline axis. For example, hydrogen fluoride (HF) may be used to etch quartz. Once the material is patterned, the liquid etching may be performed.

In further embodiments, in order to fabricate a planar geometry device such as that of FIG. 4, a first layer is deposited onto a substrate, and then a second layer is deposited onto the first layer, where the depositions can use one or more of a spin-on glass process, a Physical Vapor Deposition technique, an Atomic Layer Deposition technique, evaporative sputtering, or a thin-film deposition technique. Lithography may then be used to carve out the rectangular (or other shape) of the entire stack, and etching may be used to remove material where it is not desired (such as to form the walls of the device). Then the material having "material birefringence" is aligned, for example using linearly polarized light. Alternatively, the material could be aligned as it is deposited, one layer at a time.

A concentric ring embodiment, such as that of FIG. 5, may have a larger aperture diameter—for example, a 12 inch aperture when fabricated on a 12 inch wafer—as compared with the planar embodiment of FIG. 4, in which the aperture may be on the narrow end of the stack.

In accordance with an embodiment of the invention, the material providing "form birefringence" may be any dielectric that is transparent (loss is negligible) at wavelengths of interest. For example, the material may comprise at least one of: glass, a transparent polymer, an insulating oxide, a transparent conducting oxide, a crystal and a salt. In particular, the first material may comprise at least one of: silicon oxide, silicon dioxide, quartz, magnesium fluoride, cadmium sulfide, indium tin oxide, indium zinc oxide, silicon nitride, aluminum oxide, sapphire, chalcogenide glass, silicon, germanium and silicon carbide.

In accordance with an embodiment of the invention, the material providing "material birefringence" may, for example, be any liquid crystal exhibiting birefringence at the wavelengths of interest, including, but not limited to, liquid crystal materials listed in the Merck Catalog, the entire teachings of which are incorporated by reference in their entirety, available at www.merck-chemicals.com/catalog, published by Merck KGaA of Darmstadt, Germany.

In particular, the following crystals may be used: 4-Cyano-4'-pentylbiphenyl (commonly known as 5CB); PTPT-35; Licristal® MDA, ZLI and MLC series (sold by Merck KGaA of Darmstadt, Germany); and azobenzene liquid crystals.

In another embodiment according to the invention, a first material may be a dielectric used to create "form birefringence," while a second material is a mixture of materials that become birefringent when assembled, to create the "material birefringence." See, for example, Reference 14, 0. L. Muskens, M. T. Borgstrom, E. P. A. M. Bakkers, and J. Gomez Rivas, "Giant optical birefringence in ensembles of semiconductor nanowires," Applied Physics Letters Vol. 89, 233117 (2006), the teachings of which reference are incorporated by reference in their entirety.

In embodiments according to the invention, an optical filter as taught herein may be implemented as an actively controlled optical filter or as a passive optical filter. For example, in order to implement an actively controlled optical filter, the material having "material birefringence" may be a material that permits a voltage to be applied to control the alignment of the material, as may be done, for example, with a liquid crystal. An actively controlled optical filter may, therefore, include an optical filter as taught herein, along with a control circuit configured to apply a control voltage to the material having material birefringence, thereby permitting the optical filter to transmit all wavelengths when the control voltage signals an "off" state, and to function as an optical filter when the control voltage signals an "on" state. Such an actively controlled optical filter can, for example, be pulsed from an "on" state to an "off" state, or can be in an "on" state for certain predetermined time periods. Alternatively, for a passive optical filter, an optical filter as taught herein may be implemented without such a control circuit, thereby operating only as an optical filter.

In another embodiment according to the invention, an optical filter as taught herein may be configured to act as an optical filter in the infrared, for example by receiving light from a Quantum Cascade Laser (QCL) device, or any other infrared laser. Such an infrared optical filter may, for example, be located between an infrared laser and an optical sensor.

While embodiments have been discussed herein in which a zero-crossing filter has been designed as a narrow-bandpass filter with wide angle of acceptance, it is also possible in accordance with an embodiment of the invention to create a functionally inverse device, which has near-zero dispersion but extremely high sensitivity to angle of incidence. Such a device can have applications when placed near the focal plane of an imaging system, being able to separate incident beams coming from slightly different directions in object space. This is useful in astronomy as well as other imaging systems requiring spatial selection of an object from an axially displaced background. Utilizing the angle-dependent transmission of samples has been an accepted procedure to map out the birefringence axes of sample crystals or macromolecules in a technique called "conoscopy," in which an incident parallel beam is focused onto the focal plane through a microscope objective (Reference 16). In an embodiment according to the present invention, the functions may be inverted: the "sample" with engineered birefringence will act as an angle-sensitive filter, while the incoming light will have its angle determined by its remote spatial location. Such an angle-sensitive filter can be engineered using form birefringence alone, or in combination with material birefringence, depending on desired spectral passband.

In accordance with an embodiment of the invention, optical filters with the performance properties described herein can provide new enabling capabilities to system performance in contexts such as underwater optical communication, ground to cloud communication, as well as optical imaging or tracking through turbulent media. Embodiments may be used in high-performance optical systems and subsystems, from the deep ultraviolet to the far infrared.

REFERENCES

1. S. Cianci, J. Bland-Hawthorn and J. O'Byrne, "Designing ultra-narrowband interference filters," Proceedings of SPIE Vol. 5494, pp. 520-528 (2004).
2. O. Aharon and I. Abdulhalim, "Liquid crystal Lyot tunable filter with extended free spectral range," Optics Express, Vol. 17, No. 14, 11426-11433 (2009).
3. X. Wang, "Birefringent spectral filter with wide field of view and associated communications method and apparatus," U.S. Pat. No. 7,848,000 B2 (2010).
4. E. Donkor, P. D. Kumavor, and C. Villa, "Tunable Lyot Filters," Proc. SPIE Vol. 7339, 73390B (2009).
5. S. Saeed and P. J. Bos, "Multispectrum, spatially addressable polarization interference filter," J. Optical Society of America A Vol. 19, No. 11, pp. 2301-2312 (2002).
6. A. M. Tile and W. J. Rosenberg, "Improvements in birefringent filters. 5: Field of view effects," Applied Optics Vol. 18, No. 20, pp. 3443-3456 (1979).
7. J. Bland-Hawthorn, W. van Breugel, P. R. Gillingham, I. K. Baldry, and D. H. Jones, "A tunable Lyot filter at prime focus: a method for tracing supercluster scales at z 1," The Astrophysical Journal Vol. 563, pp. 611-628 (2001).
8. P. Yeh, "Zero crossing birefringent filters," Optics Communications, Vol. 35, pp. 15-19 (1980).
9. P. A. Yeh, "Isophase birefringent filters," U.S. Pat. No. 4,548,479 (1985).
10. J. Menders, P. Searcy, K. Roff, and E. Korevaar, "Blue cesium Faraday and Voigt magneto-optic atomic line filters," Optics Letters Vol. 17, No. 19, pp. 1388-1390 (1992).
11. Y. Wang, X. Zhang, D. Wang, Z. Tao, W. Zhuang, and J. Chen, "Cs Faraday optical filter with a single transmission peak resonant with the atomic transmission at 455 nm," Optics Express Vol. 30, No. 23 pp. 25817-25825 (2012).
12. S. D. Harrell, C. Y. She, Y. Yuan, D. A. Krueger, H. Chen, S. S. Chen, and Z. L. Hu, "Sodium and potassium vapor Faraday filters revisited: theory and applications," Journal of the Optical Society of America B Vol. 26, pp. 659-670 (2009).
13. I. Richter, P.-C. Sun, F. Xu, and Y. Fainman, "Design considerations of form birefringent microstructures," Applied Optics Vol. 34, No. 14, pp. 2421-2429 (1995).
14. O. L. Muskens, M. T. Borgstrom, E. P. A. M. Bakkers, and J. Gomez Rivas, "Giant optical birefringence in ensembles of semiconductor nanowires," Applied Physics Letters Vol. 89, 233117 (2006).
15. A. Emoto, M. Nishi, M. Okada, S. Manabe, S. Matsui, N. Kawatsuki, and H. Ono, "Form birefringence in intrinsic birefringent media possessing a subwavelength structure," Applied Optics Vol. 49, No. 23, pp. 4355-4361 (2010).
16. B. L. Van Horn and H. Henning Winter, "Conoscopic measurement of birefringence and orientation in biaxially stretched polymer films and sheets," Macromolecules Vol. 36, pp. 8513-8521 (2003).

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An optical filter comprising:
   an anisotropically patterned array comprising segments of a first material that is, absent patterning, at least one of (a) naturally isotropic or (b) naturally weakly birefringent with a weak dependence of the birefringence on wavelength; and
   at least one segment of a second material that is birefringent due to its structure at dimensions smaller than a pattern dimension of the anisotropically patterned array.

2. The optical filter according to claim 1, wherein the pattern dimension of the anisotropically patterned array is less than about one fifth of an operating wavelength of light filtered by the optical filter.

3. The optical filter according to claim 2, wherein the pattern dimension of the anisotropically patterned array is on the order of one tenth of the operating wavelength of light filtered by the optical filter.

4. The optical filter according to claim 1, wherein the second material is birefringent due to structure at dimensions on the scale of between about 0.1 nanometer and about 10 nanometers.

5. The optical filter according to claim 1, wherein the segments of the first material are spaced apart by a predetermined distance, and wherein the at least one segment of the second material extend for at least a portion of the predetermined distance between the segments of the first material.

6. The optical filter according to claim 1, wherein the filter is configured to act as a zero crossing birefringent filter such that two indices of refraction of the filter have substantially independent wavelength-varying dispersion behavior, and wherein the two indices of refraction are the same at a zero crossing wavelength of the filter.

7. The optical filter according to claim 1, wherein the filter is configured to filter light at an acceptance angle and over a bandwidth, such that the acceptance angle does not depend substantially on the bandwidth.

8. The optical filter according to claim 1, wherein a zero crossing wavelength of the filter is configured based on at least the pattern dimension of the anisotropically patterned array, a dielectric function of the first material, a dielectric function of the second material and a fill factor of the second material within the anisotropically patterned array.

9. The optical filter according to claim 1, wherein the segments of first material comprise parallel planar layers of the first material, and wherein the at least one segment of the second material comprise parallel planar layers of the second material extending for at least a portion of a distance between the parallel planar layers of the first material.

10. The optical filter according to claim 9, wherein the at least one segment of the second material is aligned by irradiation with linearly polarized light.

11. The optical filter according to claim 1, wherein the segments of first material comprise concentric rings of the first material, and wherein the at least one segment of the second material comprise concentric rings of the second material, extending for at least a portion of a distance between the concentric rings of the first material.

12. The optical filter according to claim 11, wherein the at least one segment of the second material is aligned by irradiation with at least one of a radially polarized beam and an azimuthally polarized beam.

13. The optical filter according to claim 1, the filter comprising a Lyot filter.

14. The optical filter according to claim 1, the filter comprising a Solc filter.

15. The optical filter according to claim 1, wherein the first material comprises at least one of: glass, a transparent polymer, an insulating oxide, a transparent conducting oxide, a crystal and a salt.

16. The optical filter according to claim 1, wherein the first material comprises at least one of: silicon oxide, silicon dioxide, quartz, magnesium fluoride, cadmium sulfide, indium tin oxide, indium zinc oxide, silicon nitride, aluminum oxide, sapphire, chalcogenide glass, silicon, germanium and silicon carbide.

17. The optical filter according to claim 1, wherein the pattern dimension of the anisotropically patterned array is between about 20 nm and about 5 microns.

18. The optical filter according to claim 1, wherein the second material comprises at least one of: a liquid crystal, a photoalignable polymer, and a nanowire.

19. The optical filter according to claim 1, wherein the optical filter is configured to act as an actively controlled optical filter.

20. The optical filter according to claim 1, wherein the optical filter is configured to act as an optical filter in the infrared.

21. A method of manufacturing an optical filter, comprising:
fabricating at least one segment of a first material that is, absent patterning, at least one of (a) naturally isotropic or (b) naturally weakly birefringent with a weak dependence of the birefringence on wavelength;
fabricating at least one segment of a second material that is birefringent due to its structure at dimensions smaller than a pattern dimension of the anisotropically patterned array;
the fabricating of the first material and the fabricating of the second thereby forming an anisotropically patterned array comprising segments of the first material interspersed with the at least one segment of the second material; and
aligning the at least one segment of the second material.

22. The method according to claim 21, comprising performing at least one of physical vapor deposition and atomic layer deposition to fabricate at least one of the anisotropically patterned array and the at least one segment of the second material.

23. The method according to claim 22, comprising etching a crystal comprising the second material to form the at least one segment of the second material.

* * * * *